No. 758,450. Patented April 26, 1904.

UNITED STATES PATENT OFFICE.

EMIL JOSEPH, OF BERLIN, GERMANY.

PROCESS OF PREPARING HIGHLY-DILUTED SOLUTIONS.

SPECIFICATION forming part of Letters Patent No. 758,450, dated April 26, 1904.

Application filed April 16, 1903. Serial No. 152,960. (No specimens.)

*To all whom it may concern:*

Be it known that I, EMIL JOSEPH, a citizen of the German Empire, and a resident of Berlin, Germany, (whose post-office address is Potsdamerstrasse 122°,) have invented certain new and useful Improvements in Processes of Preparing Highly-Diluted Solutions, of which the following is a specification.

The object of my invention is a process for preparing quickly and in an easy way highly-diluted solutions of organic and inorganic substances which are little or not soluble in water—such as, for instance, iron oxid, sulfate of lime, oxid of magnesia, coal-tar, naphthalene, etheric oils, and the like. Hitherto if these substances had to be used in a highly-diluted state for medical or other purposes, for preparing artificial mineral waters, mineral baths, and the like they had to be suspended in great quantities of water or to be dissolved in a solvent and to be poured into the water. Now these solutions have in general a lower specific gravity than water. Therefore the process of thoroughly mixing such a solution with great quantities of water is a very slow and difficult one.

The process forming the object of my invention enables me to mix substances of all sorts which are themselves little or not soluble in water in a very simple manner and without any loss of time with great quantities of water, thus producing a uniform solution of a very high degree of dilution.

To this end the substance is first dissolved in an appropriate solvent—for instance, an acid—and to the solution thus obtained a certain quantity of an indifferent salt, preferably a soluble one whose specific gravity is higher than that of water, is added. In this manner the specific gravity of the solution is increased in such a degree that after pouring the solution into a great quantity of water it sinks at once, spreads out to all sides, and quickly becoming diluted produces a uniform solution of a highly-diluted character. Thus, for instance, twenty parts of coal-tar are dissolved in one hundred parts of acetic acid. Fifty parts of chlorid of calcium are added to the solution. If the thick solution thus obtained be poured into ten thousand parts of water, it sinks at once and spreading out to all sides mixes quickly and thoroughly with the water.

It is further possible to hasten the process of mixing the solution with the water by adding to the latter a substance which in getting decomposed by the action of the acid contained in the solution develops carbonic-acid or another indifferent gas. Thus, for instance, one hundred parts of bicarbonate of soda may be dissolved in the water before the solution is poured into same. The carbonic-acid gas developed by aid of the acetic acid at once causes a whirling of the liquid and a thorough mixing of the solution with the water.

Having thus described the nature of my invention and in what manner the same is to be performed, what I claim is—

1. A process for quickly preparing highly-diluted solutions of such substances, which are little soluble in water, consisting in dissolving these substances in an appropriate solvent, adding to the solution thus obtained an indifferent salt soluble in the solvent and having a higher specific gravity than water, and pouring the mixture into a great quantity of water, substantially as described.

2. A process for quickly preparing highly-diluted solutions of such substances, which are little soluble in water, consisting in dissolving these substances in an appropriate solvent, adding to the solution thus obtained an indifferent salt soluble in the solvent and having a higher specific gravity than water, and pouring the mixture into a great quantity of water, said water containing a substance chemically indifferent with regard to the substance to be dissolved but easily decomposed by the solvent mentioned above and developing after decomposition an indifferent gas, substantially as described.

In testimony whereof I affix my signature in presence of two witnesses.

EMIL JOSEPH.

Witnesses:
   WOLDEMAR HAUPT,
   HENRY HASPER.